United States Patent Office 3,525,928
Patented Aug. 25, 1970

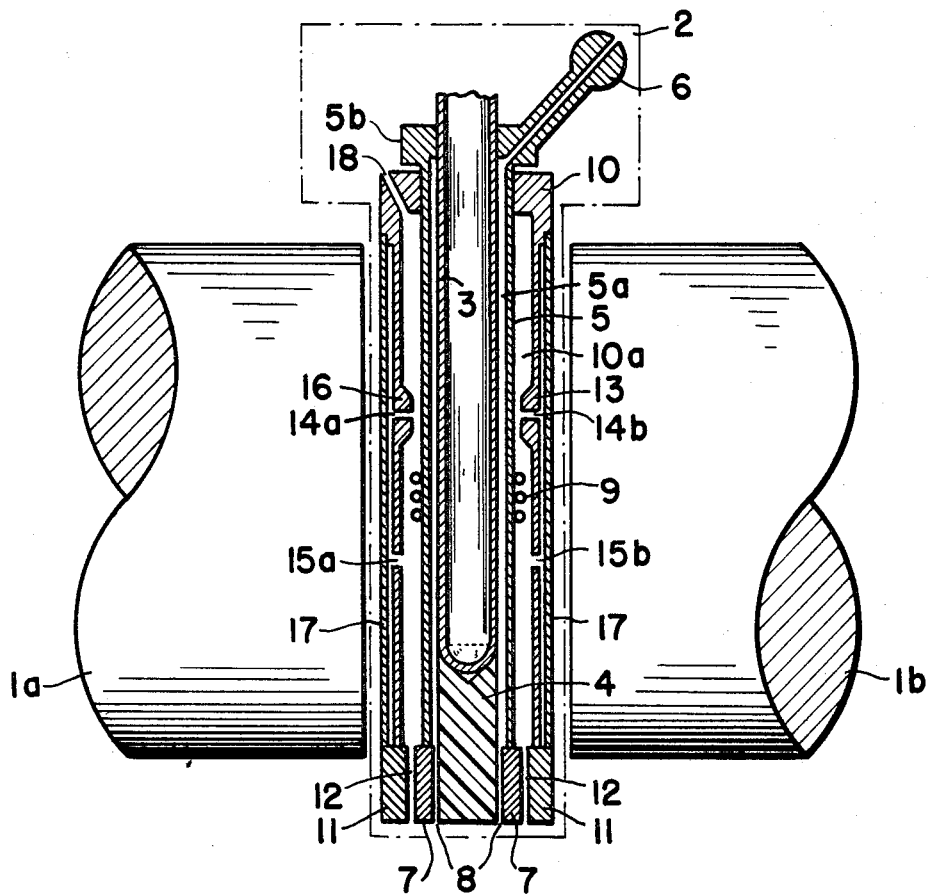

3,525,928
TEMPERATURE VARIABLE SAMPLE APPARATUS
FOR NMR ANALYSIS
Kunihiko Nagao and Kazuo Nakagawa, Tokyo, Japan, assignors to Nihon Denshi Kabushiki Kaisha, Tokyo, Japan, a corporation of Japan
Filed Nov. 21, 1968, Ser. No. 777,786
Claims priority, application Japan, Nov. 25, 1967, 42/98,957
Int. Cl. G01n 27/28
U.S. Cl. 324—.5
2 Claims

ABSTRACT OF THE DISCLOSURE

An apparatus for maintaining the temperature of a sample constant while undergoing NMR analysis and for maintaining the temperature of the apparatus itself and pole pieces constant which includes a sample holder surrounded by a first fluid chamber having an input and output. The first chamber is surrounded by a second fluid chamber having an input-output and at least two sets of openings between the second chamber and a bypass chamber positioned between said second chamber and the outer periphery of the apparatus. One set of openings is characterized by having peripheral extension into the second chamber to cause fluid flow therein according to Bernoulli's Theorem.

---

Our invention relates to a variable temperature apparatus for sample analysis and, in particular, to a novel temperature variable apparatus for nuclear magnetic resonance instrument (hereinafter referred to as NMR) analysis wherein the pole gap of the polarizing magnets are reduced to improve thermal shielding.

In general, the diameter of the magnet pole pieces used with NMR instruments must be designed in proportion to the cube of the gap between respective pole pieces. Thus, any increase in the size of the gap requires an increase in the diameter of the magnet. When electromagnets are used with NMR instruments, a large excitation current is required to produce a sufficiently intense magnetic field. In order to decrease the power required by the electromagnet, an attempt has been made to reduce the diameter of the magnet and the gap between the pole pieces. However, it has been found that when the sample to be analyzed was observed by inserting the probe member in the pole piece gap, sample heating or cooling was needed in order to improve the resolution. This requirement necessitated apparatus for maintaining a constant temperature by utilizing a heating or cooling fluid in the form of a circulation tube housed in the probe member.

When circulation is provided in the probe housing, the temperature of the pole pieces and the external wall of the probe member is changed by the heating or cooling fluid. This temperature change results in a slight change to the effective shape of the pole pieces and external wall, that adversely effects the homogeneity of the polarizing magnetic field produced by the pole pieces. As a result of the nonhomogeneous field, the resolution is appreciably reduced. Therefore, an effective thermal shield is required between the sample to be analyzed and the pole pieces.

In the prior art, a Dewar vessel was used for this purpose. However, since the space between the inner and outer walls of the Dewar is evacuated, they must be comparatively thick in order to avoid breakage. This, in addition to the fact that the vacuum layer of the Dewar is also required to be of considerable thickness in order to make the thermal shield fully effective, makes it impossible to insert a Dewar between the pole piece gap when the pole piece gap is narrow.

Accordingly, we provide a novel variable temperature apparatus for samples used in connection with NMR instruments that can be conveniently inserted in the narrow pole piece gap. Our invention also provides an improved variable temperature apparatus for sample analysis in conjunction with NMR instruments that greatly improves the effective thermal shield. Our apparatus eliminates the need for a vacuum layer by application of Bernoulli's Theorem. We form a double thermal shield utilizing a bypass for the flow of fluid between the external tube and the outer casing of the probe member.

These and other features and adavntages of our invention will become more apparent reading through the following specification in conjunction with the accompanying drawing which is a cross-sectional view of the present preferred embodiment of our novel variable temperature apparatus when inserted between the pole pieces of an NMR instrument.

A probe member 2 is housed in a thin rectangular shaped case which can be easily inserted and removed from the gap between pole pieces 1a and 1b of an NMR magnet. A cylindrical sample tube 3 containing the sample to be analyzed is arranged along the longitudinal axis of the probe member 2. The exterior of the base of the sample tube 3 is substantially V-shaped, and is positioned against a V-shaped sample tube holder 4, composed of a nonmagnetic material such as Teflon.

Sample tube 3 is surrounded by an internal tube 5, the diameter of which is arranged so as to leave a narrow gap or chamber 5a between the tube and sample tube 3. A lipped rim 5b of internal tube 5 is thickly formed and is fixed to the probe member 2 by a suitable means (not shown). The rim is in turn connected to an exhaust pipe 6 extending to the outside of probe member 2. The base of internal tube 5 is fixed to holder 7, which includes bore 8 for the introduction of heating or cooling fluid. Further, bore 8 is connected to a first pump, or blower, in the case of air (neither of which are shown), that serves to pump the heating or cooling fluid into internal tube 5, to maintain sample tube 3 constant and thereby improve the resolution of the sample contained therein. After heating or cooling the sample, the fluid passes through exhaust pipe 6.

An RF coil 9 is wound on a suitable part of the outer surface of internal tube 5 and is connected to the output of an RF oscillator (not shown). RF coil 9 produces an RF magnetic field in the gap between pole pieces 1a and 1b so that the expression $\omega = rH$, where $\omega$=the angular frequency of the RF oscillator, $r$=the gyromagnetic ration of the sample, and H=the polarizing magnetic field in the gap between the pole pieces 1a and 1b, is relationally satisfied.

An external tube 10 having an internal diameter slightly larger than the external diameter of internal tube 5 is concentrically arranged about tube 5 in probe member 2 to form chamber 10a. The base of external tube 10 is fixed to holder 11, which has a bore 12. Bore 12 is connected to a second pump or blower (not shown).

External tube 10 is indented at some suitable place, preferably in the middle, to provide constriction 13 in chamber 10a.

A first set of passageways 14a, 14b, etc. are provided through constriction 13, and a second set of passageways 15a, 15b, etc. are provided around external tube 10 at some point near the base of the tube which is not indented.

A bypass chamber 16 is formed between casing 17 of the probe member 2 and external tube 10. When a constant temperature fluid such as air is blown into the external tube 10 by means of the second blower connected to bore 8, a quantity of air (or fluid) enters bypass 16 through passageways 15a, 15b, etc., since, in accordance with Bernoulli's Theorem, the pressure of the air passing constriction 13 of tube 10 is lower than that elsewhere along the tube. The air thus diverged is blown into the main airstream through passageways 14a, 14b, etc. and exits into the atmosphere via exhaust pipe 18.

In effect, a double layer of thermal shielding is provided, thus enhancing the thermal effectiveness between the pole pieces 1a and 1b and the sample. Although the sample to be analyzed is heated or cooled by the air/fluid supplied by the first blower, the temperature of the external part of the probe member 2 and the pole pieces 1a and 1b does not vary because the temperature of the internal tube 5 is thermal shielded by the constant temperature air/fluid being blown into the external tube 10 and the bypass 16.

Thus, according to the present invention, the polarizing magnetic field always remains homogeneous in the stabilized state. In addition, since the variable temperature apparatus as described herein is much thinner than the conventional Dewar vessel, it is possible to reduce the pole piece gap and, hence, the diameter of the magnet.

We claim:

1. A temperature variable sample apparatus for use in NMR instruments having magnetic pole pieces and comprising:
   (A) a nonmagnetic probe member adapted to fit between the NMR pole pieces and having an outer casing;
   (B) a sample tube for containing a sample to be analyzed positioned along the longitudinal axis of the probe member;
   (C) a first tube concentrically positioned about the sample tube to form a first chamber between the tubes, said first chamber having a fluid inlet and outlet;
   (D) a second tube concentrically positioned between the first tube and outer casing of the probe member to form a second chamber between the first and second tubes and a bypass chamber between the second tube and outer casing, said second chamber having a fluid inlet and outlet and said bypass chamber being connected by fluid passageway means to said second chamber; and,
   (E) first and second means for supplying fluid to said inlets of said first and second chambers respectively, said bypass chamber having fluid from said second chamber moved therethrough in response to the movement of fluid through said second chamber by said second means.

2. An apparatus as set forth in claim 1 wherein said second tube is provided with circumferential projection projecting into said second chamber and said fluid passageway means comprises at least two passageways connecting the second chamber with the bypass chamber and at least one of said passageways passing through said projection.

References Cited

A Temperature Regulating System for Use With an Electron Spin Resonance Spectrometer, J. Fenger, Journal of Scientific Instruments, 1965, vol. 42, pp. 904–905.

RUDOLPH V. ROLINEC, Primary Examiner

M. J. LYNCH, Assistant Examiner

U.S. Cl. X.R.

165—109, 138, 155